United States Patent [19]
Karey et al.

[11] 4,106,080
[45] Aug. 8, 1978

[54] PHOTO FLASH DEVICE

[75] Inventors: Hans Karey, Frankfurt; Robert Oberheim, Neu Isenburg; Hans-Eberhard Heintke, Wächtersbach, all of Fed. Rep. of Germany

[73] Assignee: Braun Aktiengesellschaft, Frankfurt am Main, Fed. Rep. of Germany

[21] Appl. No.: 616,852

[22] Filed: Sep. 25, 1975

[30] Foreign Application Priority Data

Sep. 26, 1974 [DE] Fed. Rep. of Germany ....... 2446024

[51] Int. Cl.² .............................................. G03B 15/02
[52] U.S. Cl. .................................................. 362/18
[58] Field of Search ................ 240/1.3, 44.1; 354/126, 354/127

[56] References Cited

U.S. PATENT DOCUMENTS

| | | | |
|---|---|---|---|
| 2,868,958 | 1/1959 | Bounds | 354/127 X |
| 2,898,447 | 8/1959 | Hanlon | 240/1.3 |
| 3,018,707 | 1/1962 | Whittier | 240/1.3 X |
| 3,213,774 | 10/1965 | Curtiss | 354/126 |
| 3,299,788 | 1/1967 | Ackermann et al. | 240/1.3 X |
| 3,358,573 | 12/1967 | Bihlmaier | 354/126 |
| 3,783,261 | 1/1974 | Hartman | 240/44.1 X |
| 3,852,788 | 12/1974 | Ueda | 354/126 |
| 3,869,604 | 3/1975 | Prochnow | 240/1.3 |

FOREIGN PATENT DOCUMENTS

| | | |
|---|---|---|
| 49-26530 | 3/1974 | Japan |
| 256,432 | 10/1967 | Fed. Rep. of Germany. |
| 931,905 | 7/1963 | United Kingdom ..................... 354/126 |

*Primary Examiner*—Richard L. Moses
*Attorney, Agent, or Firm*—Sughrue, Rothwell, Mion, Zinn and Macpeak

[57] ABSTRACT

A flash device has a housing, a cylindrical reflector unit mounted in the housing for turning movement about its longitudinal axis, and a flash lamp positioned in the housing so that flashes emitted by the lamp are reflected by the reflector unit when the latter is turned to respective different positions.

14 Claims, 10 Drawing Figures

PHOTO FLASH DEVICE

BACKGROUND OF THE INVENTION

The present invention relates to a photo flash device in general, and more particularly to a photo flash device having a movable reflector so as to permit the flash produced by the device to be either directed at the object being photographed, or to make so called "bounce-flashes," at the option of a user.

There are instances where direct illumination of the object to be photographed with flash light is not desirable. For this reason the "bounce-flash" technique was developed in which the light emitted by the photo flash device is directed not at the object to be photographed, but against a reflecting surface, for example, the ceiling of a room in which an object is to be photographed. The reflecting surface then reflects the light back upon the object and the illumination of the object is totally different with this technique that if the light had been directed at the object itself immediately and without being first "bounced" off the ceiling.

Photo flash devices are known which may utilize either of these techniques at the option of the user, and for this purpose provide a tiltable reflector head which is mounted in a rod or bar-shaped housing and which must be fully tilted out of the housing when bounce-flash is to be used. The trouble with this prior-art approach is that when the reflector is fully tilted out of the housing, the balance of the photo flash device is destroyed so that the device in toto tends to tilt. This is undesirable for the reason that it may lead to damage of the flash tube and/or of other components of the device.

Moreover, when the reflector head is tilted outwardly of the housing and rearwardly, upwardly in order to produce a bounce flash, the rather large reflector head is located in the immediate vicinity of the face of a user of the camera provided with the flash device. This tends to hinder the proper operation of the camera.

Finally, the prior art also has the power supply cable that leads to the reflector head, exposed so that there is a constant danger that damage might be caused to the cable by accidentally hooking the same over some object thus causing it to be torn loose.

SUMMARY OF THE INVENTION

Accordingly, it is a general object of the invention to overcome the disadvantages of the prior art.

More particularly, it is an object of the present invention to provide an improved photo flash device having a reflector that can be moved between "direct illumination" and "bounce-flash" positions and which is not possessed of the disadvantages outlined above with respect to the prior art.

Another object of the invention is to provide such a device which is compact in its construction.

In keeping with these objects, and with others which will become apparent hereafter, one feature of the invention resides, in a photo flash device, in a combination which comprises housing means, a cylindrical reflector unit mounted for turning about its axis in the housing means, and a flash lamp positioned in the housing means so that flashes emitted by the lamp are reflected in different directions by the reflector unit in the respective positions thereof.

It is advantageous if the turning axis of the reflector unit is so arranged that it coincides with the axes of those housing portions which are located at its opposite ends and which are of circular configuration and journal the reflector unit for turning movement.

So constructed, the device according to the present invention assures that the reflector unit will not extend beyond the outer contour of the housing in any of its different operating positions, so that the center of gravity of the new device is not significantly changed irrespective of the position to which the reflector unit is turned.

The filter unit advantageously has a reflector element which is cylindrically curved and closes off the reflector, including the flash tube, to the exterior, the filter element having at least two different illuminating portions and being turnable with reference to the reflector unit so that its respective illuminating portions can be positioned relative to the reflector unit as desired.

The lower portion of the novel device is advantageously constructed as a bar-shaped handle having an opening which may be closed off at one side by a wall portion that extends parallel to but is spaced from the handle and which also serves to mount a cable for the supply of electrical energy to the flash tube, which cable enters at a cable inlet at the base of the housing and extends to the reflector unit. Such an arrangement providing a particularly good possibility for gripping of the lower handle by the user, since the back of the hand of a user can be supported against the wall portion that extends parallel to the handle. Moreover, due to the arrangement of the cable on the wall portion extending parallel to the handle the handle can be so configurated that it will readily fit the hand of the user, since its configuration can be selected exclusively with the use of grasping in mind and no allowance need be made for the accommodation of the cable in the hand grip itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
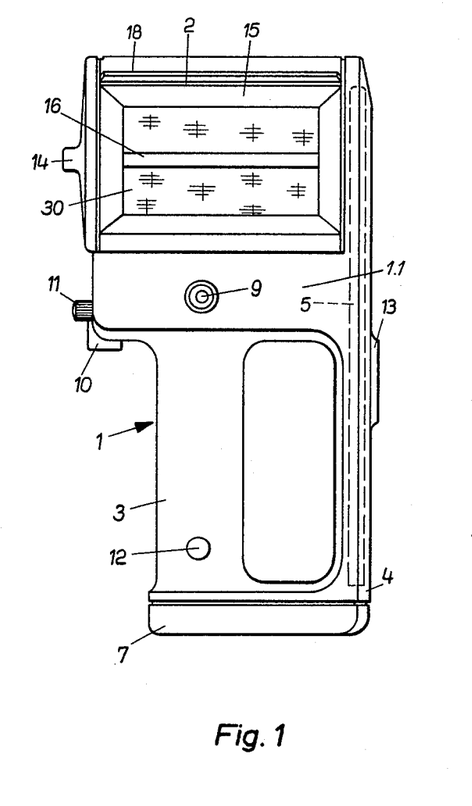
FIG. 1 is a front view of the device according to the present invention.
Figure 2:
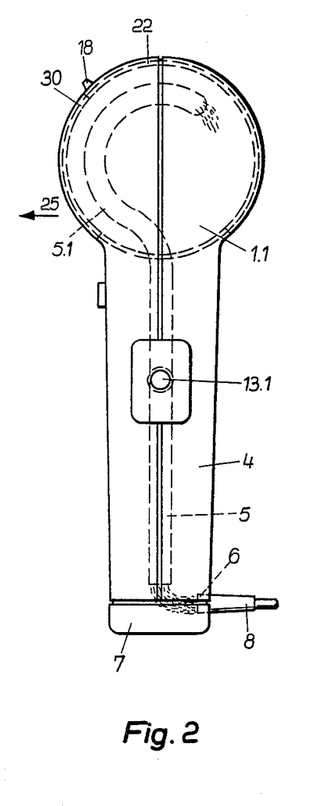
FIG. 2 is a side view of FIG. 1.

FIGS. 1 – 8 illustrate one embodiment of the invention by way of example. As FIGS. 1 and 2 show most clearly, the device 1 according to the present invention is of essentially bar-shaped configuration and has an upper part which surrounds the tiltable reflector 2 and a lower part which forms a hand grip 3.

As the drawing also shows, the opening in the hand grip 3 is closed at one side by a wall portion 4 which extends parallel to the handle and which forms the right-hand side of the housing 1.1 of the device as seen in FIG. 1. The wall portion also serves for the mounting of an electrical supply cable 5 which extends from a cable inlet 6 in the base 7 of the device into the reflector unit 2.

The upper end portion 5.1 of the cable 5 is wound to form a spiral as shown in FIG. 2, and thus can accommodate itself to turning movements of the reflector 2, being connected with the flash tube 16 in the interior of the reflector 2, since all that happens during the turning movement is that the spiral will become somewhat tighter. This arrangement eliminates the necessity for expensive slip-ring constructions within the reflector unit and contacts which engage these slip-rings in order to supply electrical energy to the flash tube. The cable 5 will be connected with a power source in the usual manner, as is self-evident and need not be described for those having ordinary skill in this field.

Figure 8:
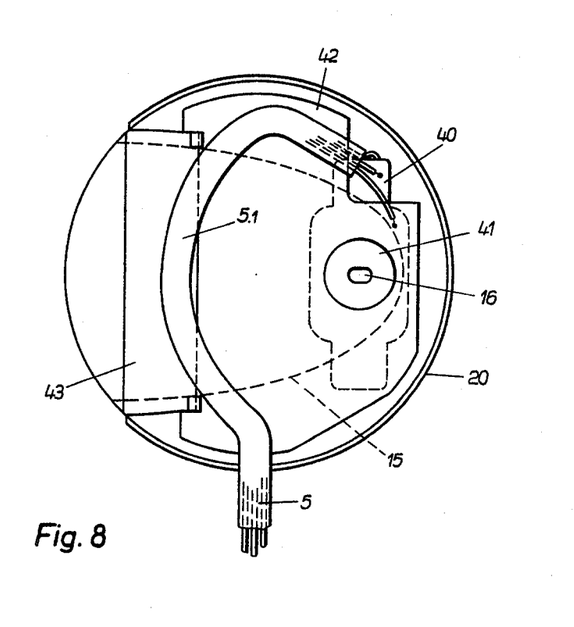
FIGS. 8 and 9 show the connection of the power supply cable in the interior of the unit.
Figure 9:
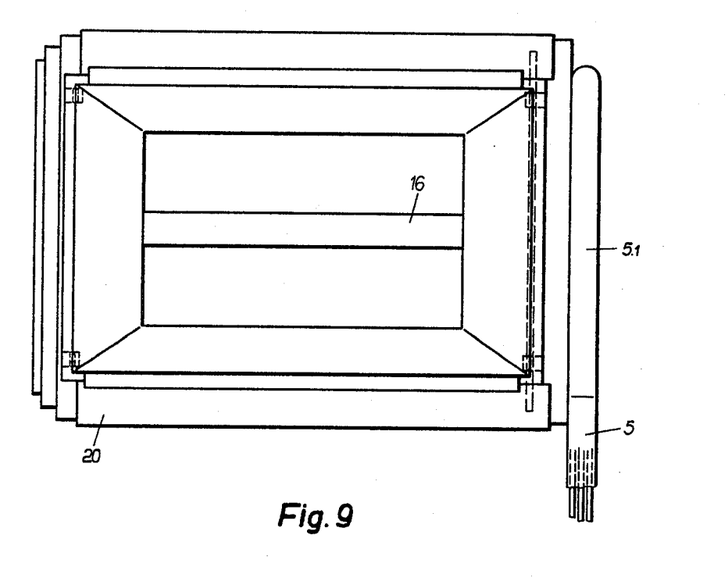

FIGS. 8 and 9 show how cable 5 is connected to a contact plate 40 in the interior of the reflector unit 2. The plate 40 is also provided with the mount 41 for the flash tube 16 and is connected with the print plate 42 which is provided with the (known) electronic circuitry of the device. Reference numeral 43 identifies the mount for plate 42.

Figure 7A:
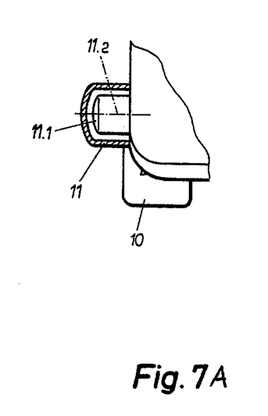
FIGS. 7A and 7B show a signal lamp of the device in a sectioned and a front view, respectively.
Figure 7B:
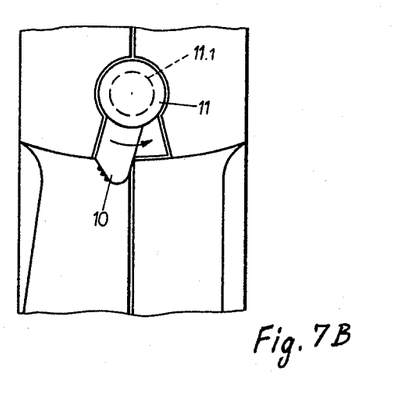

A photo electric or similar light sensor 9 is provided, as is a hand-trigger 10 and an indicating device 11 which is viewable from several different sides and indicates the readiness state of the flash unit. The device 11 has a cylindrical transparent translucent cap of e.g. synthetic plastic which extends outwardly of the housing 1.1 and which surrounds a bulb 11.1 that serves as a signal light and is energized by the light-quantity control of the device. Such a control is known, for example from U.S. Pat. Nos. 3,809,954 and 3,519,879. A release member 12 is provided by means of which the interengagement of the base 7 with a camera shoe can be released in known manner, and a member 13 serves to secure the device on a tripod or the like, being provided with threads 13.1 that can engage with cooperating threads on the tripod. Details of the bulb 11.1 are shown in FIGS. 7A and 7B. Bulb 11.1 is energized when the flash current has reached the level requirement to trigger the flash tube, to indicate operational readiness. Cap 11 has an imaginary axis 11.2 about which trigger 10 is pivotable to permit triggering of the flash tube manually, e.g. for test purposes. The spring urges trigger 10 to its rest position when the trigger is released by a user.

Figure 3:
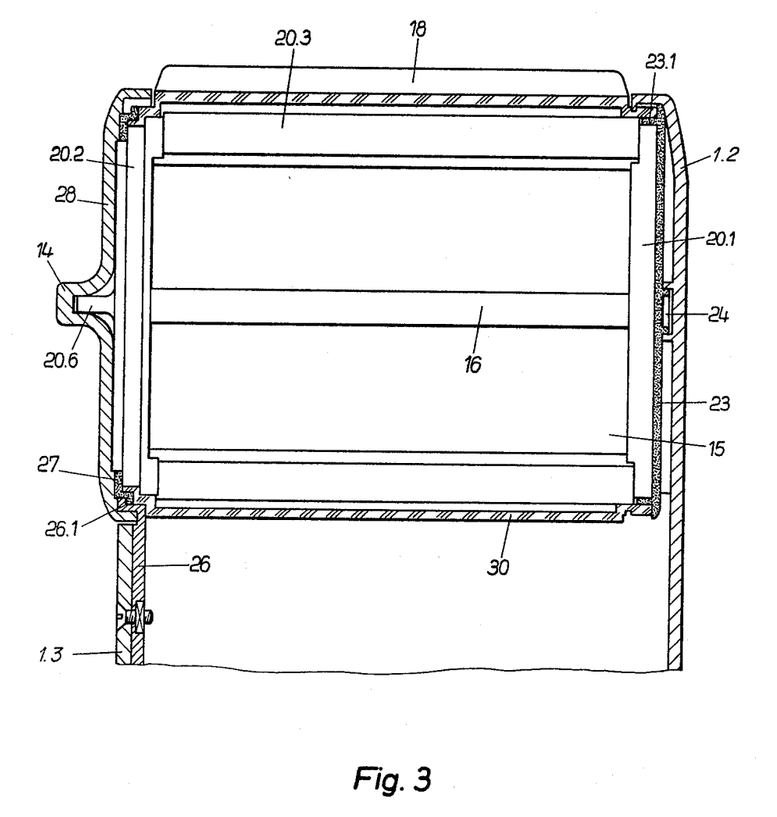
FIG. 3 is a detail view, showing how the reflector unit and the filter element of the device in FIGS. 1 and 2 are mounted.

The reflector unit 2 and the manner in which it is mounted in the housing 1.1 will be now discussed with reference to FIGS. 3 – 5. It is cylindrically configurated and is journalled for turning movement at its opposite ends in the housing 1.1. An elongated handle 14 is provided by means of which the filter unit 2 can be turned. A reflector element 30, which surrounds the reflector 15 of the unit together with the flash tube 16 and which has two different light emitting regions 30.1 and 30.2, is also cylindrically configurated and provided with a handle 18 so that it can be turned relative to and independently of the reflector unit 2.

The reflector unit 2 has a housing having housing portions 20.1 and 20.2 provided at the narrow sides of the device 1 and laterally delimiting the reflector. The housing portions 20.1 and 20.2 are at least partially embraced by the lateral sides of the housing 1.1. The housing portion 20.1 of the reflector unit 2 is journalled in the adjacent wall portion 1.2 of the device 1 by means of a centering plate 23 which surrounds the reflector housing and which is fixedly connected with the wall portion 1.2 of the device 1; the plate 23 has an annular shoulder 23.1 which serves as a journal for the housing portion 20.1 of the reflector unit 2. The centering plate 23 is shown in FIG. 5 as having associated with it a spring-loaded detent arrangement 24 which cooperates with two depressions 20.4 and 20.5 in the housing portion 20.1 of the respective unit whenever the light outlet 25 of the reflector 15 is directed forwardly as shown in FIG. 5, or is turned upwardly through 120° from this position, by turning of the reflector unit 2. The sector-shaped cutout in the centering plate 23 permits the power supply cable 5 to enter the interior of the reflector unit 2.

Figure 4:
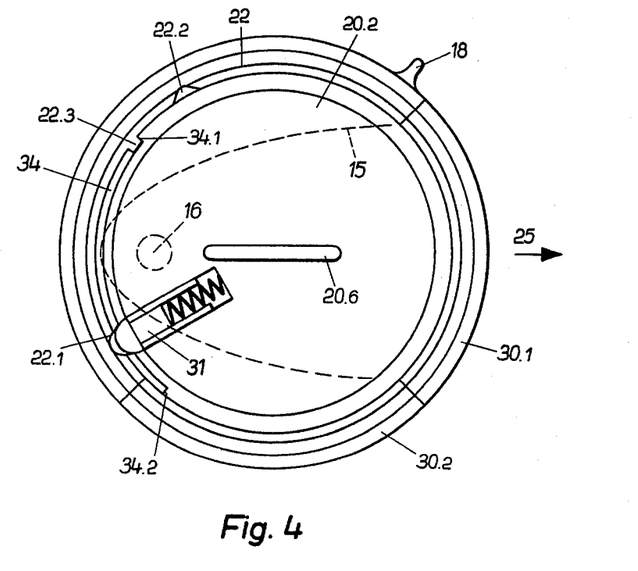
FIG. 4 is a detail view showing the left-portion of the mounting shown in FIG. 3.
Figure 5:
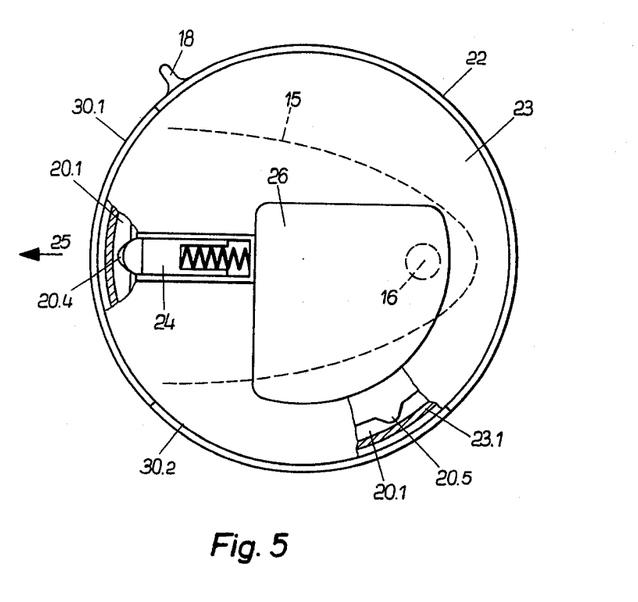
FIG. 5 is a view similar to FIG. 4 but showing the right-hand portion of the mounting in FIG. 3.

FIG. 4 shows how the housing portion 20.2 of the reflector unit 2 is mounted in the region of the left-hand wall portion 1.3 of the housing of the device 1. A plate 26 is fixedly connected with the wall portion 1.3 and has an offset part 26.1 which serves as a support for a centering ring 27 that is part of the reflector unit 2. The housing portion 20.2 of the reflector unit 2 is fixedly connected with the centering ring 27. A plate 28 on which the elongated handle 14 is formed, is mounted on the housing portion 20.2 by means of a wall portion 20.6 so that there can be no relative turning movement. The handle 14 serves to turn the reflector unit 2 from the "direct-flash" position shown in FIG. 5 into the previously mentioned "bounce-flash" position and back.

Figure 6:
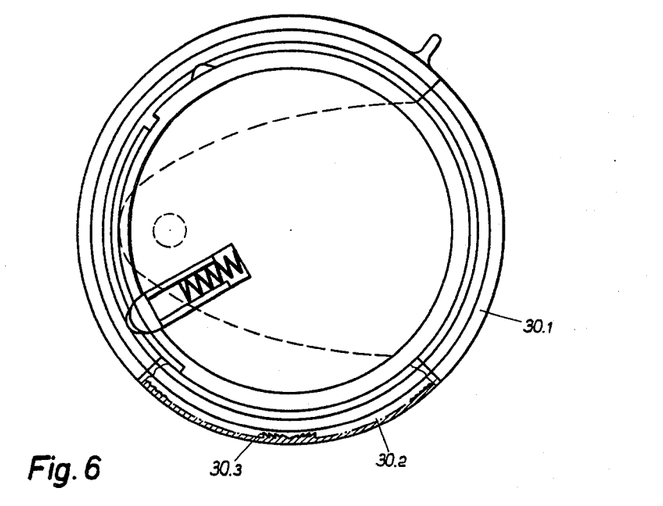
FIG. 6 is a view analogus to FIG. 5, but showing a reflectorized portion of the unit in the preceding Figures.

The reflector wall 22 of the reflector unit 2 forms with the filter element 30 a hollow cylindrical annular body, the left end of which is turnably journalled between the plate 26 and the center ring 27 and the right end of which is turnably journalled between the housing portion 1.2 and the centering plate 23. This annular body can be turned via the associated handle 18 relative to the reflector unit 2, from a normal position in which the transparent portion 30.1 of the filter element 30 covers the light outlet 25 of the reflector into a right-angle position in which the portion 30.2, which is provided with prismatic bodies, is pivoted in front of the light outlet 25 of the reflector. FIG. 6 shows the cylindrical portion 30.2 as being provided with prismatic projections, which in the illustrated embodiment project inwardly. They extend parallel to one another over the entire length of element 30 (and thus parallel to flash tube 16, as shown in FIG. 3) and obtain a wide-angle dispersion of the emitted light. A further spring-loaded detent arrangement 31 is provided in the housing portion 20.2 and cooperates with the recesses 22.1 and 22.2 in the reflector wall 22 to arrest the annular body in its two positions described above.

The arresting effect exerted by the detent arrangement 24 is stronger than that exerted by the detent arrangement 31, an effect which may for example be obtained by using identical detent arrangements 24 and 31 by providing that there is a different radius of engagement into the recesses 20.4 and 20.5 than into the recesses 22.1 and 22.2. The purpose of this arrangement is to assure that when the reflector unit 2 is moved from one to the other of its operating positions, the filter element 30 does not change its own operating position within the unit 2, whereas a turning of the filter element 30 from the normal position to the right-angle position, or vice versa, cannot cause any change in the position of the reflector unit 2.

To prevent unintentional overrunning of the arresting positions of the reflector element 30, the filter wall 22 is preferably formed with abutments 22.3 which engages and moves in a groove 34 provided in the housing portion 20.2, the groove 34 being formed with shoulders 34.1 and 34.2 against which the abutment 22.3 impinges when one or other operating positions of the filter element 30 has been changed. A corresponding arrangement is provided between the plate 28 and the housing portion 1.3 in order to prevent the reflector unit 2 from travelling beyond its respective positions.

It will be understood that each of the elements described above, or two or more together, may also find a useful application in other types of constructions differing from the types described above.

While the invention has been illustrated and described as embodied in a photo flash device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photo flash device, a combination comprising housing means; a cylindrical reflector unit mounted for turning about its axis in said housing means, said reflector unit comprising a reflector, a cylindrically curved wall member embracing said reflector and said flash lamp and having at least two different light-emitting regions of different optical characteristics, and means for rotating said wall member; and a flash lamp positioned in said housing means so that flashes emitted by said lamp are reflected by said reflector unit in respective positions thereof.

2. A combination as defined in claim 1, wherein one of said regions is of transparent material and the other of said regions is provided with prismatic portions for increasing the scattering angle of light emitted from said other region.

3. In a photo flash device, a combination comprising housing means; a cylindrical reflector unit mounted for turning about its axis in said housing means, said reflector unit comprising a turnable reflector, further comprising a cylindrically curved wall member embracing said flash lamp and reflector and being turnable independently of the latter, said curved wall member having at least two different light emitting regions of different optical characteristics, and spring-loaded detent means for releasably retaining said reflector unit and wall member in respective angular positions thereof.

4. A combination as defined in claim 3, wherein the detent means of said unit supersedes the detent means of said wall member.

5. In a photo flash device, a combination comprising housing means, said housing means comprising a substantially bar-shaped lower part shaped as a handgrip, said lower part being elongated and having an open side, and further comprising a wall clearing said open side and extending parallel to the elongation of said lower part; a cylindrical reflector unit mounted for turning about its axis in said housing means; said housing means being translucent in the pivot zone of said reflector unit; and a flash lamp positioned in said housing means so that flashes emitted by said lamp are reflected by said reflector unit in respective positions thereof.

6. A combination as defined in claim 5; and further comprising an electrical conductor in said wall and extending from said reflector unit to the base of said lower part.

7. A combination as defined in claim 6, said conductor having one unit end portion adjacent said reflector unit and provided with an end connected thereto, said unit end portion being spirally coiled and freely located in said housing means so as to be able to yield in response to turning of said unit.

8. In a photo flash device, a combination comprising housing means; a cylindrical reflector unit mounted in said housing means and located within a portion thereof, said reflector unit being turnable about its axis relative to said portion of said housing means to a plurality of different positions in each of which it remains located within the outer contour lines of said housing means, said reflector unit comprising a reflector, a cylindrical wall portion embracing said reflector and having at least two different regions of different optical characteristics for emission of light from said reflector unit, and externally accessible gripping means to facilitate turning said reflector unit about its axis; and a flash lamp positioned in said housing means so that flashes emitted by said lamp are reflected by said reflector unit in the respective positions thereof.

9. A combination as defined in claim 8; and further comprising indicating means visible from a plurality of sides of said device for indicating the flash readiness state of said device.

10. A combination as defined in claim 9, said indicating means comprising a cylindrical cap projecting from said housing means, and a signal lamp within said cap and energizable in dependence upon the flash readiness state of said device.

11. In a photo flash device, a combination comprising housing means; a cylindrical reflector unit mounted for turning about its axis in said housing means, said reflector unit having spaced axial ends, said housing means comprising circular portions at said opposite ends and turnably journalling said unit; said housing means being translucent in the pivot zone of said reflector unit; and a flash lamp positioned in said housing means so that flashes emitted by said lamp are reflected by said reflector unit in respective positions thereof.

12. In a photo flash device, a combination comprising housing means; a cylindrical reflector unit mounted for turning about its axis in said housing means, said housing means being translucent in the pivot zone of said reflector unit, said reflector unit having spaced axial ends, and an end plate at one of said ends, and further comprising a manually engageable portion at said end plate, elongated transverse to said axis and connected with said unit for turning the same; and a flash lamp positioned in said housing means so that flashes emitted by said lamp are reflected by said reflector unit in respective positions thereof.

13. In a photo flash device, a combination comprising housing means having an upper part and a lower part; a cylindrical reflector unit mounted in said upper part of said housing means and located within a portion thereof, said reflector unit being turnable about its axis relative to said portion of said housing means to a plurality of different positions in each of which it remains located within the outer contour lines of said housing means, said reflector unit comprising a reflector, a cylindrically curved wall member embracing said reflector and being translucent in the pivot zone of said reflector unit, and externally accessible gripping means to facilitate turning said reflector unit about its axis; and a flash lamp positioned in said housing means so that flashes emitted by said lamp are reflected by said reflector unit in the respective positions thereof.

14. In a photo flash device, the combination comprising:

a housing having an upper part and a lower part, said upper part being in the form of a substantially complete hollow cylinder having a longitudinal axis;

a light reflector turnable to different positions and mounted in said upper part for turning about an axis coincident with said longitudinal axis, said upper part being translucent in the pivot zone of said reflector;

externally accessible gripping means to facilitate turning said reflector about its axis; and a flash lamp positioned in said housing so that flashes emitted by said lamp are reflected by said reflector in the respective positions thereof.

* * * * *

UNITED STATES PATENT AND TRADEMARK OFFICE
CERTIFICATE OF CORRECTION

PATENT NO. : 4,106,080
DATED : August 8, 1978
INVENTOR(S) : Hans Karey, et al.

It is certified that error appears in the above—identified patent and that said Letters Patent are hereby corrected as shown below:

IN THE CLAIMS:

Claim 1, Column 5, lines 38-39, delete "and said flash lamp".

Claim 3, Column 5, line 55, delete "flash lamp and".

Signed and Sealed this

Third Day of April 1979

[SEAL]

Attest:

RUTH C. MASON
*Attesting Officer*

DONALD W. BANNER
*Commissioner of Patents and Trademarks*